United States Patent [19]
Andre et al.

[11] Patent Number: 6,015,154
[45] Date of Patent: Jan. 18, 2000

[54] LARGE DISPLACEMENT HYDROSTATIC WORKPIECE HOLDER

[75] Inventors: William M. Andre, Rochester Hills, Mich.; Bruce W. Irwin, Sr., Fort Pierce, Fla.

[73] Assignee: Hydra-Lock Corporation, Mt. Clemens, Mich.

[21] Appl. No.: 09/085,953

[22] Filed: May 28, 1998

[51] Int. Cl.[7] .............................. B23B 31/30; B23B 31/40
[52] U.S. Cl. ........................ 279/2.07; 279/2.08; 279/4.03; 279/4.11; 243/571.2; 243/576.1; 294/98.1
[58] Field of Search ................................. 279/2.07, 2.08, 279/4.03, 4.11; 242/571.1, 571.2, 576.1; 294/98.1

[56] References Cited

U.S. PATENT DOCUMENTS

| | | | |
|---|---|---|---|
| 4,114,909 | 9/1978 | Taitel et al. | 279/2.07 |
| 4,135,677 | 1/1979 | Warczaak | 242/571.1 |
| 4,317,577 | 3/1982 | Cameron | 279/2.07 |
| 4,953,877 | 9/1990 | Slachta et al. | 279/2.07 |
| 5,429,376 | 7/1995 | Mueller et al. | 279/4.03 |

*Primary Examiner*—Steven C. Bishop
*Attorney, Agent, or Firm*—Reising, Ethington, Barnes, Kisselle, Learman & McCulloch, P.C.

[57] ABSTRACT

A hydrostatic tool holder having a displaceable metal sleeve formed with a plurality of circumferentially spaced and longitudinally extending slots and a flexible, polymeric ring defining at least in part a fluid chamber to separate the fluid in the chamber from the sleeve to prevent the fluid from escaping through the slots in the sleeve. The slots in the metal sleeve enable a large displacement of the sleeve through the polymeric ring so that the hydrostatic tool holder may be used with workpieces having rough finishes, such as cast metal workpieces like cylinder liners for internal combustion engines, which as cast have relatively rough surfaces and relatively low dimensional accuracy.

19 Claims, 4 Drawing Sheets

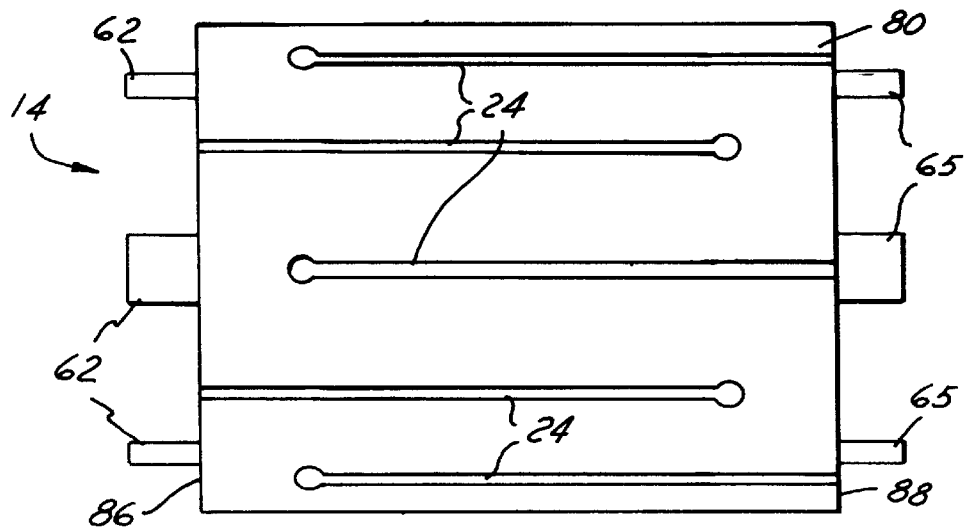
FIG. 2
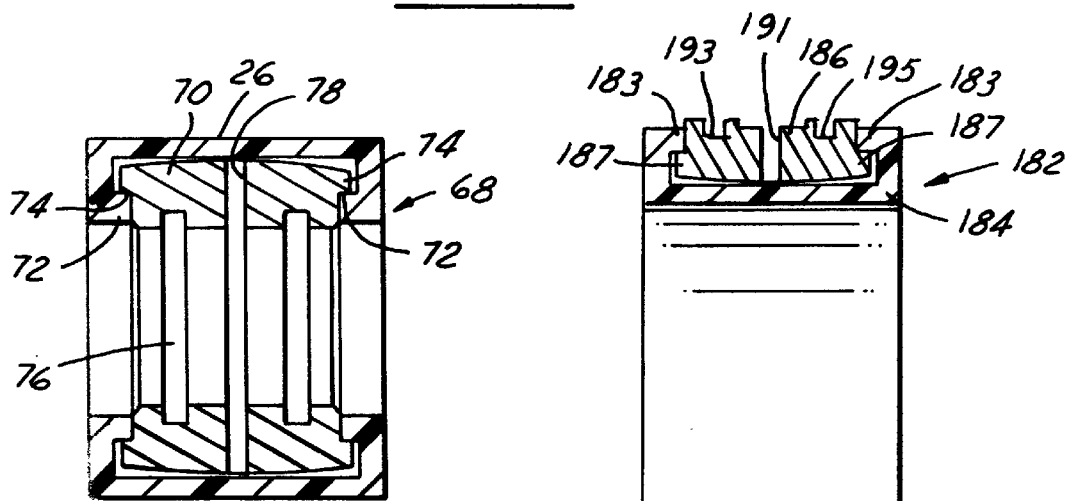
FIG. 3
FIG. 6

LARGE DISPLACEMENT HYDROSTATIC WORKPIECE HOLDER

FIELD OF THE INVENTION

This invention relates generally to machine tools and more particularly to hydrostatic workpiece holders.

BACKGROUND OF THE INVENTION

Various hydrostatic tool holders are known, such as that disclosed in U.S. Pat. No. 5,516,243, which has one or more chambers containing a fluid which, when pressurized contracts a relatively thin metal sleeve to engage and firmly hold and locate a tool shank received within the sleeve. While this hydrostatic tool holder is effective and reliable in use, the solid steel sleeve is contracted within its elastic limits and only a very small amount under the pressure of the fluid in use.

SUMMARY OF THE INVENTION

In some applications, a much greater contraction or expansion of a sleeve would be necessary to assure a firm grip of a workpiece. For instance, cast metal workpieces have relatively rough surfaces and are generally not cast with a high level of dimensional accuracy and thus, the size of similar workpieces may vary significantly. Therefore, to enable the hydrostatic holder to firmly hold various workpieces, a solid steel sleeve would have to be contracted or expanded such a significant amount that it would be permanently deformed. Moreover, it would require that an extremely high pressure be applied by the hydraulic fluid. It is highly undesirable to so greatly increase the pressure of the hydraulic fluid because of the difficulty in providing an adequate seal of the hydraulic fluid chambers when such a high pressure is used.

A hydrostatic workpiece holder having a deflectable metal sleeve formed with a plurality of circumferentially spaced and longitudinally extending slots and a flexible, liquid-tight, polymeric ring defining at least in part a fluid chamber to separate the fluid in the chamber from the sleeve to prevent the fluid from escaping through the slots in the sleeve. The slots weaken the metal sleeve so that the sleeve can be displaced with significantly less force. Reducing the force necessary to deflect the sleeve enables a large displacement of the sleeve without having to apply excessive force to the sleeve so that the hydrostatic workpiece holder may be used with cast parts such as cylinder liners for internal combustion engines which have relatively rough surfaces and relatively low dimensional accuracy. Desirably, the sleeve may be displaced by 0.25 of an inch or more in use.

In one embodiment, the slotted metal sleeve is disposed about the exterior of an arbor with the polymeric ring and associated fluid chamber defined within the sleeve so that the force of the pressurized fluid in the fluid chamber acts outwardly on the sleeve to radially outwardly displace or expand the sleeve into from engagement with the inner surface of a workpiece received on the arbor. In another embodiment, the slotted metal sleeve is received within a bore of a chuck or some such other workpiece holder. In this embodiment, the polymeric ring and fluid chamber are disposed surrounding the exterior of the sleeve so the force of the pressurized fluid in the fluid chamber acts inwardly on the sleeve to radially inwardly deflect or contract the sleeve into engagement with a workpiece received within the sleeve. In each embodiment, the force of the pressurized fluid is transferred to the metal sleeve through the polymeric ring to deflect or displace the metal sleeve.

Objects, features and advantages of this invention include providing a hydrostatic workpiece holder which has a metal sleeve which may be significantly displaced under a relatively low pressure of fluid applied to the sleeve to firmly hold a workpiece received adjacent to the sleeve, can be used to firmly hold and locate workpieces formed of cast material, can conform to a workpiece which is out of round, dampens vibrations during the machining process, provides a better finish of the part machined, repeatably and reliably holds and locates the workpieces, reliably centers each workpiece, may be formed of different thicknesses to accommodate different sized parts, can be displaced generally radially inwardly or radially outwardly and is of relatively simple design and economical manufacture and assembly and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 2 is a side view of a slotted metal sleeve of the hydrostatic arbor of FIG. 1;

FIG. 3 is a cross sectional view of a subassembly of a polymeric ring and a retainer of the arbor;

FIG. 6 is a cross sectional view of a subassembly of a polymeric ring and a retainer of the chuck.

DETAILED DESCRIPTION OF THE PREFERRED EMBODIMENTS

Figure 1:
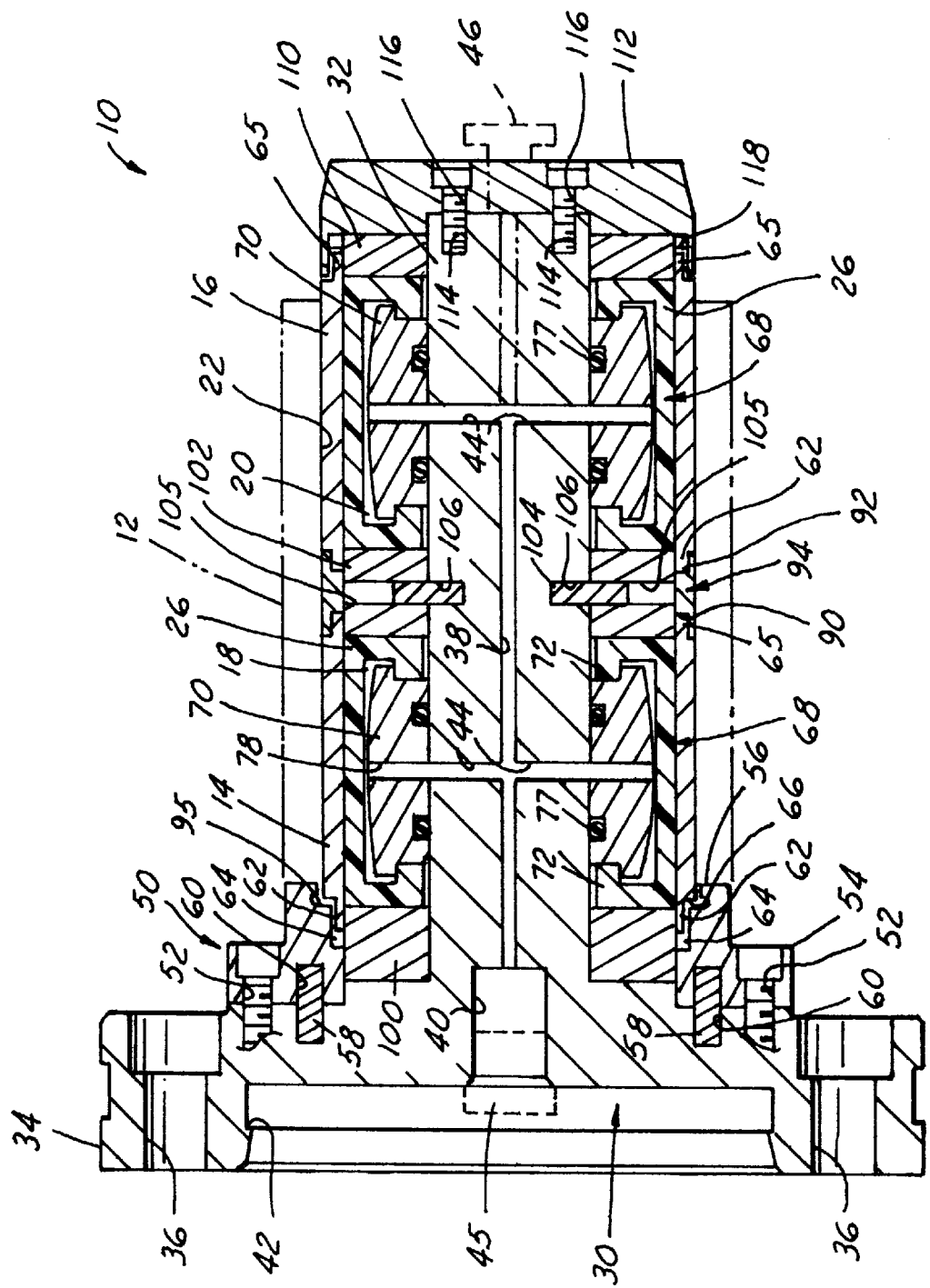
FIG. 1 is a cross sectional view of a hydrostatic arbor embodying the present invention.

Referring in more detail to the drawings, FIG. 1 illustrates a hydrostatic part holder, and more specifically, a hydrostatic arbor 10 constructed to firmly hold and accurately locate on center a tubular workpiece 12 received thereon such as a cast iron cylinder sleeve for an engine. The arbor 10 has a pair of tubular metal sleeves 14, 16 which are acted on by a pressurized fluid received in a pair of separate fluid chambers 18, 20 defined in part by polymeric rings 26 within and closely adjacent the metal sleeves 14, 16 to expand the metal sleeves 14, 16 into engagement with the inner surface 22 of the workpiece 12. To facilitate expanding the metal sleeves 14, 16, a plurality of circumferentially spaced and longitudinally extending slots 24 (FIG. 2) are formed through the metal sleeves 14, 16. To prevent the pressurized fluid in the fluid chambers 18, 20 from escaping through the slots 24, the circumferentially continuous polymeric rings 26 are disposed between the fluid in the fluid chambers 18, 20 and the metal sleeves 14, 16 and define in part the fluid chambers 18, 20 in which the pressurized fluid is received. Thus, the force produced by pressurizing the fluid acts on the metal sleeves 14, 16 through the polymeric rings 26 to expand the sleeves 14, 16 into engagement with the workpiece 12.

A representative workpiece 12 is a cast iron sleeve, such as a cylinder liner for internal combustion engines. Plural workpieces formed from cast material have relatively rough surfaces and significant variations in inside and outside diameter and hence, a large displacement of the metal sleeves 14, 16 is needed to firmly hold and accurately locate on center one at a time the plurality of workpieces 12 on the arbor 10 as they are machined.

The arbor 10 has a main body 30 with a cylindrical shaft 32 and a radially extending mounting flange 34 at one end. The body 30 is constructed to be mounted on a spindle of a machine tool for corotation with the spindle and may be mounted on the spindle by suitable bolts or screws received through circumferentially spaced bores 36 through the flange 34. The body 30 has a blind bore or fluid passage 38 extending into the shaft 32, a first counterbore 40 and a second counterbore 42. The fluid passage 38 is constructed to be filled with the fluid and communicates with the fluid chambers 18, 20 via branch passages 44 extending through the body 30 generally transversely to the fluid passage 38.

Figure 4:
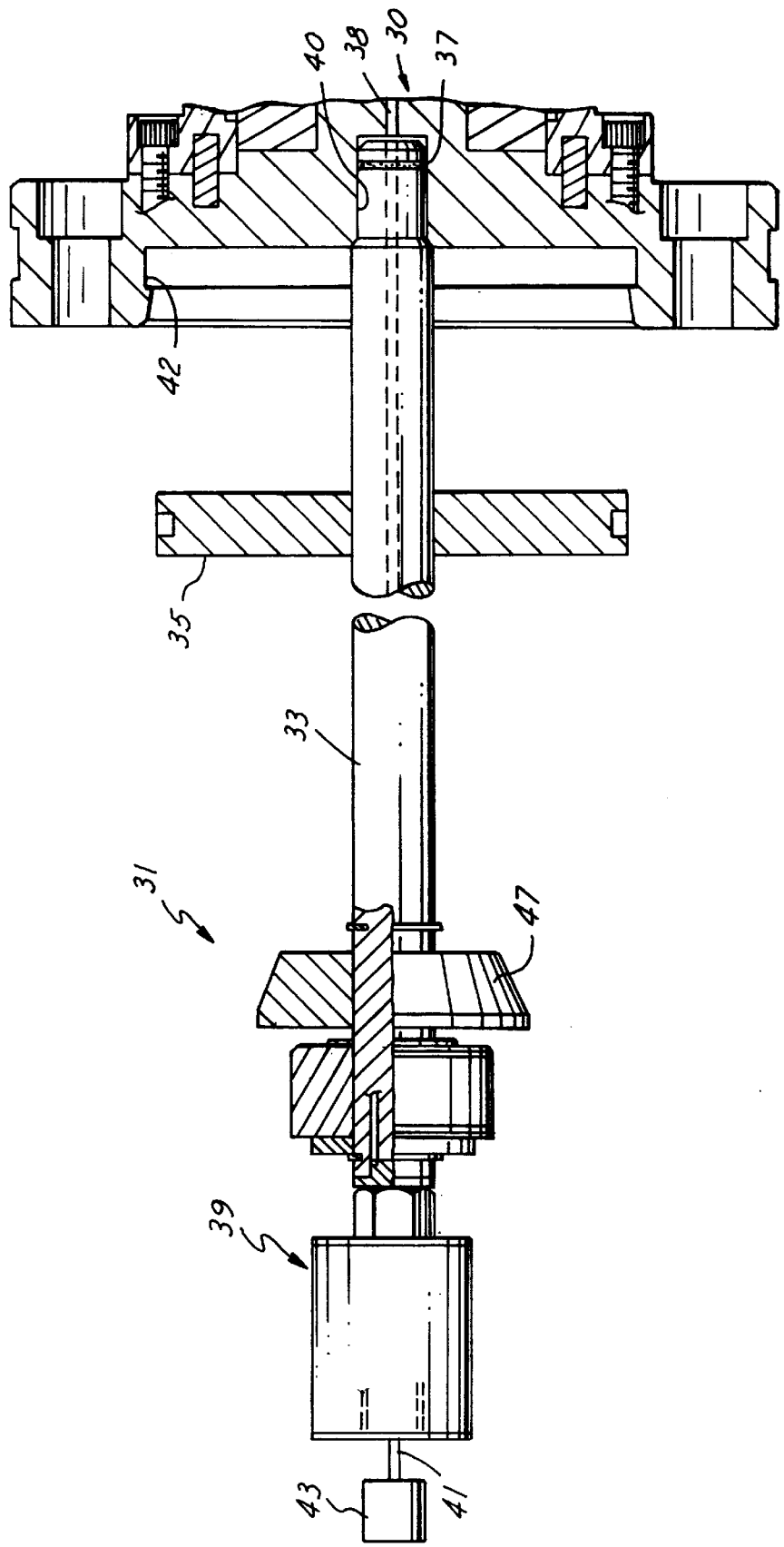
FIG. 4 is a partial sectional view of a pressurized fluid supply assembly received in the arbor.

As shown in FIG. 4, a pressurized fluid supply assembly 31 has one end of a supply tube 33 constructed to be received through the machine spindle and into the counterbore 40 in the arbor body 30 with a bushing 35 received in the spindle. The supply tube 33 rotates with the arbor 10 in use. A seal 37 carried by the tube 33 substantially prevents leakage of the fluid between the tube 33 and arbor body 30. A coupling 39 interconnects the supply tube 33, which rotates with the arbor 10, with a fluid supply line 41 which provides pressurized fluid from an external source 43 to the supply tube 33 for delivery to the fluid chambers 18, 20. A cone clamp 47 may be provided to mounted on the assembly 31 on the machine spindle.

Alternatively, a plug or stop 45 is received in the first counterbore 40 and is removable to fill or empty the fluid from the body 30. At the opposite end of the body 30, a set screw 46 (as shown in phantom in FIG. 1) is threadably received in the fluid passage 38 and is displaceable to either directly pressurize the fluid in the fluid passage 38 and fluid chambers 18, 20, or to actuate a piston, to do so. In either construction, pressurized fluid is provided to the fluid chambers 18, 20 as desired.

An annular stop ring 50 is connected to the body 30 by a plurality of circumferentially spaced bolts or screws received through complimentary bores 52 through a radially extending flange 54 of the stop ring 50. To locate the workpiece 12 relative to the arbor body 30, the stop ring 50 has an annular flat face 56 which the workpiece 12 abuts when received on the arbor 10. To locate the stop 50 ring relative to the body 30, a dowel 58 is received in each of a plurality of circumferentially spaced blind bores 60 in both the stop ring 50 and the body 30. To retain the metal sleeve 14 adjacent the stop ring 50, the sleeve 14 preferably has axially extending tabs 62 received in slots 64 of the stop ring to drive the sleeve 14 for rotation as the arbor 10 rotates. The tab and slot arrangement permits the sleeve 14 to expand radially without being restrained by the stop ring 50. Similar tabs 65 extending from the opposite side of the sleeve 14 are received in slots 90 formed in a retainer ring 94 in assembly.

As shown in FIG. 3, each fluid chamber 18, 20 is defined in part by a subassembly 68 of a polymeric ring 26 and an annular retainer 70. The polymeric ring 26 is generally U-shaped in cross section and has a pair of opposed, inwardly extending flanges 72 which in assembly engage outwardly extending shoulders 74 of the retainer 70. A suitable material for the polymeric ring 26 is polyurethane. The retainers 70 preferably have a pair of spaced apart, circumferentially continuous grooves 76 each constructed to receive a sealing member, such as an O-ring 77 therein to provide a fluid-tight seal between the retainer 70 and the shaft 32 of the arbor body 30. A central passage 78 through the retainer 70 communicates the branch passages 44 with the fluid chambers 18, 20.

As shown in FIG. 2, each metal sleeve 14, 16 has a central land 80 and the tabs 62, 65 extending from each end slightly inwardly from the outer diameter of the land 80 providing shoulders 86, 88 to facilitate locating and retaining the sleeves 14, 16 on the arbor 10. As noted, the sleeve 14 is received adjacent the stop ring 50 and retainer ring 94 and the sleeve 16 has tabs 62 received in slots 92 on the other side of the retainer ring 94 and tabs 65 received in slots 118 in a nose 112 of the arbor 10. The slots 24 formed through the land 80 of the metal sleeves 14, 16 are preferably generally equally circumferentially spaced and extend generally longitudinally or axially of each sleeve 14, 16 The slots 24 weaken the metal sleeves 14, 16 to facilitate expansion of at least the central portions of the sleeves 14, 16 to urge them into firm engagement with the workpiece 12. Preferably, as shown in FIG. 1, a pair of metal sleeves 14, 16 are provided to substantially uniformly grip the elongate inner surface 22 of the workpiece 12. The metal sleeves 14, 16 are preferably flexible enough to conform to and center an out of round workpiece 12 so that the workpiece 12 can be machined into a true round condition. Preferably, the sleeves 14, 16 may expand 0.25 of an inch or more in use. Further, sleeves 14, 16 of different thicknesses may be provided to enable the arbor to hold parts with different interior diameters.

In assembly, the stop ring 50 is connected to the radial flange 34 of the arbor body 30 and an annular ring 100 is disposed on the shaft 32 of the arbor body 30. Next, a first subassembly 68 of a polymeric ring 26 and an annular retainer 70 is disposed on the shaft 32 adjacent the ring 100. A ring 102 is then received on the shaft 32 with one or more dowels 104 received in bores 105 through the ring and blind bores 106 formed in the shaft 32 to accurately locate and retain the ring 102. Next, a second subassembly 68 of a polymeric ring 26 and annular retainer 70 is received on the shaft 32 adjacent to the ring 102 and an outer annular ring 110 is disposed adjacent the opposite side of the second subassembly 68. So located and assembled, the rings 100, 102, 110 restrain axial displacement of the rings 26 when the fluid is pressurized and provide a liquid-tight seal preventing any fluid which may leak from the fluid chamber 18, 20 from escaping between them. Further, the rings 100, 102, 110 accurately locate and center the sleeves 14, 16.

The first metal sleeve 14 is then telescoped over the various components 68, 100, 102, 110 on the shaft 32 of the arbor 10 with its shoulder 86 bearing on a shoulder 95 of the stop ring 50 and the tabs 62 positioned in slots 64. The retainer ring 94 is disposed over the components on the shaft 32 adjacent to the first metal sleeve 14 with the slots 90 receiving the other tabs 65 of the metal sleeve 14. The second metal sleeve 16 is telescoped over the components on the shaft 32 with its tabs 62 on one end received in slots 92 in the other side of the retainer ring 94. Finally, a nose 112 is bolted to the shaft 32 with two or more screws received in holes 116 through the nose and threaded into blind bores 114 in the shaft. The nose 112 has slots 118 which at least partially receive the adjacent tabs 65 of the second metal sleeve 16 to drive the metal sleeve 16 for rotation with the arbor 10.

In use, the workpiece 12 is disposed over the metal sleeves 14, 16 until it engages the face 56 of the stop ring 50. To firmly hold the workpiece 12 on the arbor 10, fluid under pressure is provided from an external source through the supply tube 33, the passages 38, 44 in the arbor body 30 and to the fluid in the fluid chambers 18, 20. The pressurized fluid radially outwardly expands the polymeric rings 26 which firmly engage and radially outwardly expand or flex the metal sleeves 14, 16 to urge the metal sleeves 14, 16 into firm engagement with the inner surface 22 of the workpiece 12 to fly hold and accurately locate the workpiece 12 for machining. To remove the workpiece 12 after it has been machined, the pressure of the fluid supplied to the arbor is decreased thereby decreasing the pressure of the fluid in the fluid chambers 18, 20 to relax the metal sleeves 14, 16.

Second Embodiment

Figure 5:
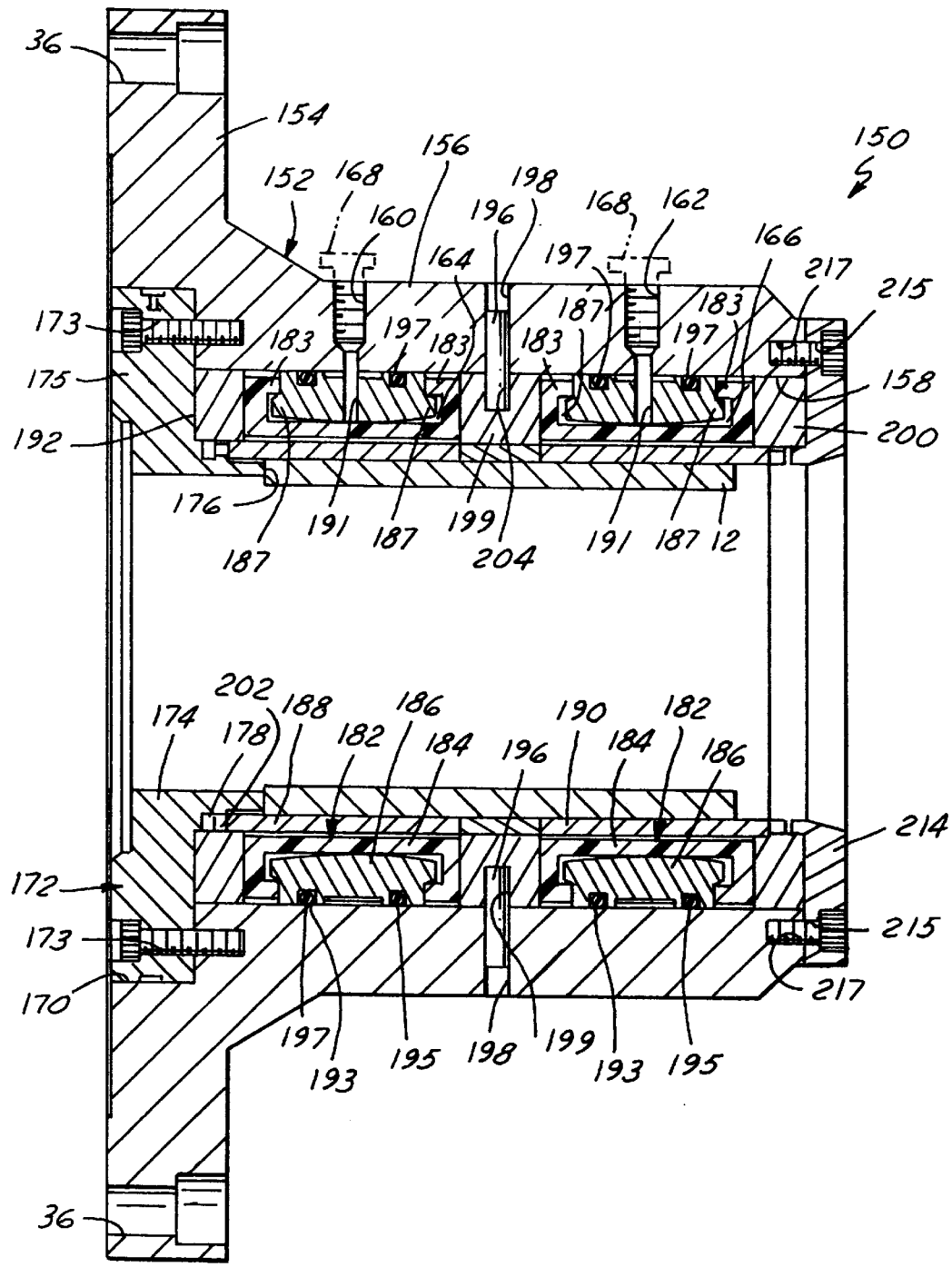
FIG. 5 is a cross sectional view of a hydrostatic chuck according to a second embodiment of the present invention.

FIG. 5 illustrates a hydrostatic chuck 150 according to a second embodiment of this invention. The chuck 150 has a body 152 with a radially extending flange 154 constructed to be bolted to a machine spindle for corotation therewith. The body 152 has a generally cylindrical sidewall 156 with a through bore 158 and a pair of fluid passages 160, 162 through which fluid is supplied to spaced apart fluid chambers 164, 166. Preferably, a pair of pressurized fluid supply tubes (not shown) communicate with each fluid passage 160, 162 to supply fluid under pressure from an external source to the fluid chambers 164, 166. Alternatively, as shown in phantom in FIG. 5, a threaded screw 168 received in each fluid passage 160, 162 is rotated to control the pressure of the fluid in each of the fluid chambers 164, 166. A counterbore 170 formed in the body 152 receives a stop ring 172 which is attached to the body 152 by a plurality of spaced apart bolts received through holes 173 in a radially extending flange 175 of the stop ring 172. The stop ring 172 has an annular wall 174 extending into the bore 158 and constructed to provide a stop surface 176 which abuts the workpiece 12 to locate the workpiece 12 within the chuck 150. Alternatively, the workpiece can be located by air registration or other suitable means.

As in the first embodiment, the chuck 150 has two subassemblies 182 of polymeric rings 184 and annular retainers 186 which in part define the fluid chambers 164, 166 that contain the pressurized fluid to urge two slotted metal sleeves 188, 190 into engagement with the workpiece 12. The subassemblies 182, as shown in FIG. 6, each have the polymeric ring 184 disposed inside the annular retainer 186 whereas the polymeric ring 26 of the first embodiment subassembly 68 was disposed about the exterior of the annular retainer 70. The polymeric ring 184 has inwardly extending flanges 183, received over outwardly extending shoulders 187 of the retainer 186. Radial passages 191 through the retainer 186 communicates the fluid passages 160, 162 with their associated fluid chamber 164, 166 respectively. Spaced apart grooves 193, 195 in the retainer 186 are each constructed to receive a sealing member, such as an O-ring 197, to provide seals between the retainer 186 and the chuck body 152. The metal sleeves 188, 190 are also of the same general construction as the metal sleeves 14, 16 of the first embodiment. The subassemblies 182 of the chuck 150 are disposed over or around the metal sleeves 188, 190 rather than within the metal sleeves and the metal sleeves 188, 190 themselves receive the workpiece 12 therein rather than disposing the workpiece 12 on or around the sleeves 14, 16 as in the first embodiment of holder 10. Sleeves 188, 190 of different thicknesses may be provided to enable the chuck 150 to be used with workpieces having different outside diameters.

To assemble the chuck 150, an annular ring 192 is received within the bore 158 of the body 152 abutting the flange 175 of the stop ring 172. A first subassembly 182 of a polymeric ring 184 and an annular retainer 186 is then received within the bore 158 adjacent to the ring 192. An intermediate annular ring 194 is disposed adjacent to the first subassembly 182 and is located by a plurality of circumferentially spaced dowels 196 received in bores 198 through the sidewall 156 of the body 152 and in blind bores 199 in the ring 194 to locate the ring 194. The second subassembly 182 of a polymeric ring 184 and annular retainer 186 is then received within the bore 158 adjacent to the intermediate ring 194 and an outer ring 200 is disposed within the bore 158 adjacent the other end of the second subassembly 182. Next, the first metal sleeve 188 is disposed within rings 192, 194, and the first subassembly 182 with one end received between the stop ring wall 174 and the ring 192. An annular ring 204 is inserted adjacent the other end of first metal sleeve 188 and the second metal sleeve 190 is received adjacent thereto. As in the first embodiment, the rings 192, 194, 200 restrain axial displacement of the ends of the polymeric rings 184 by the pressurized fluid and provide a seal between them. Further, the rings 192, 194, 200 accurately locate and center the sleeves 188, 190.

An annular nose 214 is attached to the body 152 by bolts or screws received through holes 215 in the nose and threaded into blind bores 217 in the body 152. The nose 214 overlaps and retains the ring 200 in the body. The nose 214 retains the metal sleeves 188, 190 within the chuck 150.

In use, the workpiece 12 is received within the metal sleeves 188, 190 with one end abutting the stop surface 176 of the stop ring 172 (or located by air registration). To firmly hold and accurately locate the workpiece 12 within the chuck 150, pressurized fluid is preferably provided through suitable supply tubes to the fluid passages 160, 162 of the chuck body 152 to provide pressurized fluid in the fluid chambers 164, 166 which produces a force urging the polymeric rings 184 into engagement with the outer surface of the metal sleeves 188, 190. The force acting on the metal sleeves 188, 190 displaces or contracts the metal sleeves 188, 190 and urges them into firm engagement with the workpiece 12 to firmly hold and accurately locate the workpiece 12 so that its inner surface may be machined.

The hydrostatic holders 10, 150 according to the present invention enable a relatively large displacement of one or more metal sleeves 14, 16, 188, 190 to urge the metal sleeves 14, 16, 188, 190 into firm engagement with a workpiece 12 to hold and accurately and repeatably align and center the workpiece 12 relative to the holder 10, 150. The diameter of the metal sleeves may change about 0.10 to 0.35 of an inch to firmly hold the workpiece. In the holder 10, a workpiece 12 is received on a hydrostatic arbor 10 and its metal sleeves 14, 16 are radially outwardly displaced or expanded to firmly engage the inner surface 22 of the workpiece 12 so that its outer surface may be machined. In the holder 150, its metal sleeves 188, 190 are radially inwardly displaced or contracted to firmly engage the outer surface of the workpiece 12 so that its inner surface may be machined. The relatively large displacement of the slotted metal sleeves 14, 16, 188, 190 is necessary to firmly hold cast workpieces such as cylinder liners for internal combustion engines which as cast have a relatively rough surface finish and substantial variation in their inside and outside diameters.

We claim:

1. An apparatus to releasably retain a workpiece with a generally cylindrical surface comprising:
    a body;
    at least two spaced apart and separate polymeric rings carried by the body, each polymeric ring defining at least in part a fluid chamber constructed to contain a fluid; and two separate annular, generally cylindrical metal sleeves each formed with at least one slot and having an inner surface and an outer surface, each sleeve carried by the body with at least one polymeric ring adjacent to and engageable with one of the inner or outer surfaces of each sleeve and the other of the inner and outer surfaces of each sleeve being constructed to receive and directly engage a workpiece, and the slots enabling each sleeve to undergo a change in diameter of as much as at least 0.10 of an inch to firmly engage a workpiece, one sleeve being disposed adjacent each end of the workpiece when the workpiece is received by the sleeves, whereby when the fluid in the fluid chamber is pressurized, the force of the pressurized fluid is transmitted through the polymeric ring to the sleeve to urge the sleeve into firm engagement with the workpiece to firmly hold the workpiece.

2. The apparatus of claim 1 wherein the workpiece is received around the outer surface of each sleeve and the pressurized fluid acting on each sleeve through each polymeric ring expands each sleeve radially outwardly to urge each sleeve into engagement with the workpiece.

3. The apparatus of claim 1 wherein the workpiece is received within each sleeve adjacent the inner surface of each sleeve and the pressurized fluid acting on each sleeve through each polymeric ring contracts each sleeve generally radially inwardly to urge each sleeve into engagement with the workpiece.

4. The apparatus of claim 1 wherein each polymeric ring is generally U-shaped in cross-section and is received on an annular retainer to define in part a fluid chamber.

5. The apparatus of claim 4 which also comprises at least one passage formed in the body and communicating with the fluid chamber through a passage formed in each retainer, each passage constructed to contain the fluid under pressure.

6. The apparatus of claim 5 wherein each retainer carries at least one sealing member each disposed between the retainer and the body to prevent fluid from leaking between the retainer and the body.

7. The apparatus of claim 1 wherein a pair of spaced apart polymeric rings are provided each adjacent a separate metal sleeve.

8. The apparatus of claim 4 wherein each polymeric ring has a pair of spaced apart and circumferentially continuous, inwardly extending flanges each received over one of a pair of circumferentially continuous, outwardly extending shoulders of the retainer to retain the polymeric ring on the retainer.

9. The apparatus of claim 5 which also comprises one branch passage for each fluid chamber, each branch passage communicates the passage in the body with the passage of a retainer.

10. The apparatus of claim 5 which also comprises a piston received within the passage in the body, the piston is displaceable to control the pressure of the fluid.

11. The apparatus of claim 1 wherein each metal sleeve is generally unrestrained in their desired direction of displacement so that each sleeve can be substantially uniformly displaced along its entire length so that each sleeve substantially uniformly engages the workpiece.

12. The apparatus of claim 1 which also comprises a nose connected to the body with each metal sleeve retained between the nose and the body.

13. The apparatus of claim 1 wherein each metal sleeve has a plurality of circumferentially spaced, longitudinally extending slots formed therethrough to facilitate displacing the sleeve.

14. The apparatus of claim 5 which also comprises a fluid supply tube which provides pressurized fluid from an external source to each passage.

15. The apparatus of claim 1 wherein the diameter of a metal sleeve changes by about 0.10 inch to 0.35 inch when the force of the pressurized fluid is provided to the sleeve through the polymeric rings.

16. The apparatus of claim 1 wherein each metal sleeve is substantially centered relative to the body and is formed of an at least somewhat flexible material such that each sleeve may firmly hold and center a workpiece which is out of round with minimal distortion.

17. The apparatus of claim 1 which also comprises at least three spaced apart rings each carried by the body and engageable adjacent an end of at least one sleeve with said one of the inner and outer surfaces of the sleeves which is engaged by the polymeric ring to support each sleeve adjacent both of its ends concentric with the axis of rotation of the body at least when the sleeves are not urged into engagement with the workpiece.

18. An apparatus to releasably retain a workpiece with a generally cylindrical surface comprising:
   a body;
   at least one polymeric ring carried by the body, each polymeric ring defining at least in part a fluid chamber constructed to contain a fluid; and
   at least one annular, generally cylindrical metal sleeve formed with at least one slot and having an inner surface and an outer surface, each sleeve carried by the body with at least one polymeric ring adjacent to and engageable with one of the inner or outer surfaces of each sleeve and the other of the inner and outer surfaces of the sleeve being constructed to receive and directly engage a workpiece, and the slots being constructed and arranged to enable each sleeve to undergo a change in diameter of as much as at least 0.10 of an inch to firmly engage a workpiece, whereby when the fluid in the fluid chamber is pressurized, the force of the pressurized fluid is transmitted through the polymeric ring to the sleeve to urge the sleeve into firm engagement with the workpiece to firmly hold the workpiece.

19. The apparatus of claim 18 which also comprises at least two rings carried by the body and engageable adjacent an end of a sleeve with said one of the inner and outer surfaces of the sleeve which is engaged by a polymeric ring to support each sleeve adjacent its ends concentric with the axis of rotation of the body at least when the sleeves are urged into engagement with the workpiece.

* * * * *

UNITED STATES PATENT AND TRADEMARK OFFICE
CERTIFICATE OF CORRECTION

PATENT NO. : 6,015,154
DATED : January 18, 2000
INVENTOR(S) : William M. Andre and Bruce W. Irwin, Sr.

It is certified that error appears in the above-indentified patent and that said Letters Patent is hereby corrected as shown below:

Col 8, Line 54, after "adjacent" insert -- both --.

Signed and Sealed this

Third Day of April, 2001

Attest:

NICHOLAS P. GODICI

*Attesting Officer*  *Acting Director of the United States Patent and Trademark Office*